United States Patent [19]

Witzke et al.

[11] 4,118,546

[45] Oct. 3, 1978

[54] TRIPLE ELECTRODE PHOTOGALVANIC CELL WITH ENERGY STORAGE CAPABILITY

[75] Inventors: Horst Witzke, Princeton; Schoen-nan Chen, North Brunswick; Satyendra K. Deb, East Brunswick, all of N.J.; Michael A. Russak, Farmingdale, N.Y.

[73] Assignees: Optel Corporation, Princeton, N.J.; Grumman Aerospace Corporation, Bethpage, N.Y.

[21] Appl. No.: 763,071

[22] Filed: Jan. 27, 1977

[51] Int. Cl.$^2$ .......................... H01M 6/30; H01M 6/36
[52] U.S. Cl. ....................................... 429/111
[58] Field of Search ......................................... 429/111

[56] References Cited

U.S. PATENT DOCUMENTS

| | | | |
|---|---|---|---|
| 3,708,220 | 1/1973 | Meyers et al. | 350/160 R |
| 4,011,149 | 3/1977 | Nozik | 204/129 |

OTHER PUBLICATIONS

G. Hodes et al., "Photochemical Energy Conversion & Storage Using Polycrystalline Chalcogenide Semiconductors," *Bull. Israel Phys. Soc.*, vol. 22, p. 100, (1976).

G. Hodes et al., "Photoelectrochemical Energy Conversion & Storage Using Polycrystalline Chalcogenide Electrodes," *Nature*, vol. 261, pp. 403–404, (1976).

M. S. Wrighton et al., "Photoassisted Electrolysis of Water by Irradiation of a Titanium Dioxide Electrode," *Proc. Nat. Acad. Sci. USA*, vol. 72, No. 4, pp. 1518–1522, Apr., 1975.

*Primary Examiner*—Aaron Weisstuch
*Attorney, Agent, or Firm*—Morris Liss; Israel Gopstein

[57] ABSTRACT

A photogalvanic cell includes a glass substrate with a transparent electrode which receives irradiating light energy. A second electrode is positioned in spaced relationship from the first electrode and has a thin film of charge storing tungsten oxide deposited thereon. Spaced from both the transparent electrode and the tungsten oxide thin film is a counterelectrode. An electrolyte having $TiO_2$ powder mixed therein forms a photoactive site at the surface of the transparent electrode. By physically separating the tungsten oxide thin film from the transparent electrode, more light irradiates the $TiO_2$ thereby increasing the photoconversion of the cell.

11 Claims, 2 Drawing Figures

TRIPLE ELECTRODE PHOTOGALVANIC CELL WITH ENERGY STORAGE CAPABILITY

FIELD OF THE INVENTION

The present invention relates to photogalvanic cells utilizing an aqueous electrolyte and more particularly to such a cell that is also capable of storing charge.

BRIEF DESCRIPTION OF THE PRIOR ART

In copending U.S. patent application Ser. No. 582,344, filed May 30, 1978, now U.S. Pat. No. 4,085,257, a photogalvanic cell is disclosed which has charge storing capability. The cell has a face against which impinging light strikes, the face including a thin film of charge storing tungsten oxide which contacts the contained electrolyte across the entire surface of the thin film. In the electrolyte it is the $TiO_2$ which is primarily responsible for the conversion of light to electrical energy. Although the device disclosed in the copending application operates satisfactorily, it suffers from a disadvantage. This is due to the fact that the tungsten oxide will assume a color in response to light irradiation. The colored tungsten oxide acts as a filter which absorbs visible light energy which could otherwise irradiate the $TiO_2$ resulting in a greater energy conversion efficiency when the electrolyte is sensitized to visible light.

BRIEF DESCRIPTION OF THE PRESENT INVENTION

The present invention is an improvement over the structure set forth in the previously mentioned copending application. Whereas the device in the referenced application includes an electrode upon which a charge storing thin film of tungsten oxide is deposited and which further serves as the electrode for the photoactive $TiO_2$ in the electrolyte, the present invention is designed to utilize separate electrodes for the charge storage layer and the photoactive $TiO_2$. As a result of this separation, the aforementioned light filter problem is avoided because irradiating light is permitted to impinge onto the $TiO_2$ directly rather than through the tungsten oxide material. In one embodiment of the present invention, the $TiO_2$ is not utilized as a suspended powder in the electrolyte but is rather present in the form of a thin film. The present design permits the charge storage layer of tungsten oxide and the thin film $TiO_2$ to be of different physical form. For example, the $TiO_2$ may be a thin film while the tungsten oxide may be a sintered body which has distinct advantages as to energy conversion and operating characteristics.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
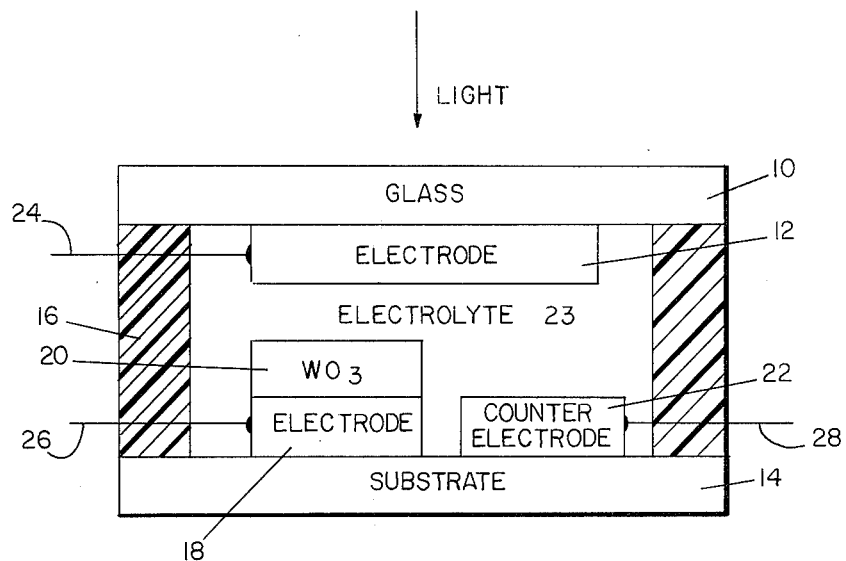
FIG. 1 is a diagrammatic cross-sectional view of a first embodiment of the present invention.

Referring to the figures, and more particularly FIG. 1 thereof, a glass substrate 10 supports a light transparent thin film conductive electrode 12 made from a material such as $SnO_2$. The combination of the glass and deposited electrode is commercially available and is known as Nesa glass. A non-conductive substrate 14 is positioned in spaced relationship to the thin film electrode 12 and may be fabricated from a suitable support material such as plastic or glass. A circumferential wall 16 encloses the interior of the cell, the wall being made from most any suitable inert sealing insulating material such as epoxy. A thin film electrode 18 is deposited upon the substrate 14 and extends toward the thin film electrode 12. A layer 20 of charge storing material such as tungsten oxide is deposited as a film upon the electrode 18 by conventional techniques such as evaporation, sputtering or chemical vapor deposition. The purpose of the layer 20 is to store charge after an irradiating source is removed. A counterelectrode 22 is also deposited on the substrate 14 in spaced relation to the electrode 18. The counterelectrode may be made from a suitable material such as carbon or platinized carbon which is deposited by coating or silk screening.

A void created in the interior of the cell is filled with an electrolyte 23 including a suspending agent, such as glycerine, a photoactive material such as $TiO_2$ powder, and a solution of acid, typically sulfuric acid. This electrolyte was referred to as a charge compensation layer in the previously mentioned copending application. Preferably, the $TiO_2$ is in the anatase form although the rutile form is satisfactory.

In order to make the electrolyte 23 sensitive to visible light, an agent must be added to the electrolyte. In a preferred embodiment of the invention, this may be done by incorporating a dye system such as an N-methylphenazine dye system. Physically, this is accomplished by adding a material such as N-methylphenazine methosulfate which is commercially available from a source such as Eastman Kodak Company, and is available in powdered form. The utilization of such a dye system is discussed in a copending patent application Ser. No. 740,875 filed November 11, 1976, entitled "N-Methylphenazine Photogalvanic Cell" by Schoen-nan Chen and assigned to the same assignee as this present application. Of course, the invention is not limited by the specific mentioned dye system. Rather it is only necessary that an appropriate sensitizing material be added to the electrolyte which will sensitize the $TiO_2$ to visible light which is ordinarily only sensitive to ultraviolet light. If a different photoactive material were used, which was sensitive to visible light, a sensitizing material would, of course, not be necessary.

Leads 24, 26 and 28 are respectively connected to the electrode 12, the electrode 18, and the counterelectrode 22. These leads permit electrical energy to be drawn from the cell in response to irradiation, and after irradiation is removed due to the advantageous storage capability of the cell.

In operation of the device, a light to electrical energy conversion occurs at the photoactive site or interface between the electrolyte 23 and the electrode 12. Stored charge is derived from the tungsten oxide thin film 20 through the electrode 18.

From the above description of the first embodiment, it will be noted that the design is conceived so that there is an absence of the charge storage layer 20 from the photoactive site. As a result, maximum photoconversion is made possible since the charge storage layer does not filter the irradiating light as it passes into the cell.

It is also possible to modify the cell so that the charge storage layer 20 appears as a ring in overlying relation with the wall 16. Of course, in such an event the charge storage layer must still make contact with an electrode since material such as tungsten oxide cannot always effectively function as a conductor.

In operation of the device, a selector switch (not shown) may be connected to the wires 24, 26 and 28. This would permit the electrode 12 and counterelectrode 22 to be connected across a load (not shown) for utilization of photoconverted electrical energy during irradiation. Likewise, a jumper could be connected between electrodes 12 and 18 to achieve charge storage during irradiation of the cell. Alternately, the electrode 18 and counterelectrode 22 may be connected across an external load to discharge the charged electrical energy, particularly when the irradiating source of light is removed.

Figure 2:
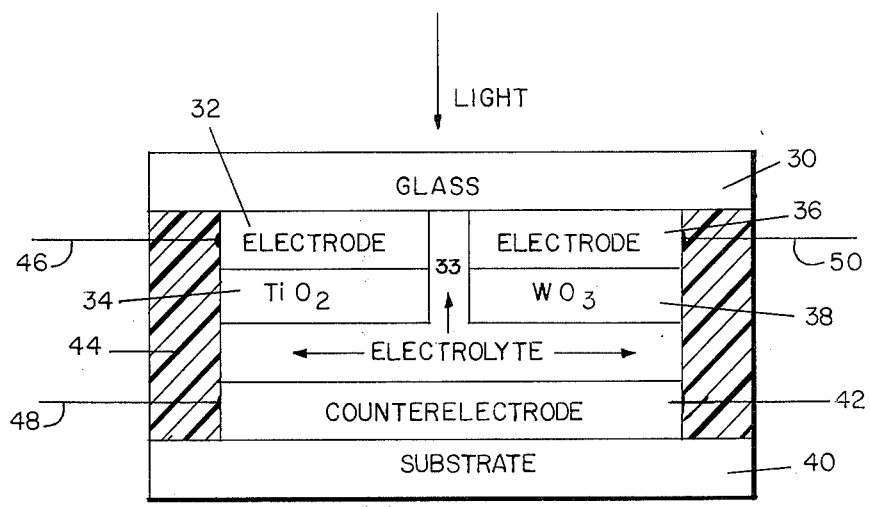
FIG. 2 is a diagrammatic cross-sectional view of a second embodiment of the present invention.

FIG. 2 illustrates an alternate embodiment of the invention which essentially shows a different geometric configuration for the various components of the cell.

A substrate 30 made from glass has a thin film electrode 32 deposited thereon, which may be the material doped $SnO_2$. A thin film of photoactive material, such as $TiO_2$ is shown at 34 to be deposited on the electrode 32. In this alternate embodiment, the electrolyte shown at 33 remains an aqueous acidic medium but does not contain the $TiO_2$ pigment as was the case in connection with the first embodiment. Rather, the $TiO_2$ is deposited as a thin film at 34. A separate thin film electrode 36 which may be of the same material as electrode 32 is also deposited on the glass substrate 30. The electrodes 32 and 36 may be formed on Nesa glass whose conductive transparent thin film has been etched to electrically isolate the two separate electrodes 32 and 36. A charge storage layer 38, of suitable material such as tungsten oxide, is deposited on the electrode 36. Whereas the thin film 34 forms a photoactive site with the electrolyte 33 along the interface between film 34 and electrolyte 33, the charge storage layer 38 of tungsten oxide primarily stores charge which makes electricity available from the cell after irradiating light ceases.

As previously mentioned in connection with the embodiment of FIG. 1, a sensitizing agent must be added to the electrolyte so that the $TiO_2$ becomes sensitive to visible light. As previously mentioned, an N-methylphenazine dye system may be used although this is not a limitation on the invention. Rather, other materials may be added to the electrolyte which will sensitize the $TiO_2$ to visible light and render the cell absorptive to visible light.

An insulating substrate 40 is positioned in spaced registry with the glass substrate 30. In the case of the substrate 40, a plastic or glass material may be utilized. The substrate 40 is used as a supporting member for a counterelectrode 42, which is coated or silk screened onto the substrate 40. The counterelectrode 42 may be fabricated from carbon or platinized carbon. As to the electrolyte 33, the inclusion of glycerine to the aqueous acidic medium is no longer necessary for suspending the $TiO_2$ which is present in the first embodiment but not in this embodiment.

Leads 46, 48 and 50 are connected to the electrodes/counterelectrodes 32, 42 and 36, respectively. Electrode 32 and counterelectrode 42 are connected to a load when photoconverted energy is to be used during irradiation. In order to achieve charge storage during irradiation, a jumper conductor is connected between electrode 32 and electrode 36. Electrode 36 and counterelectrode 42 would be connected in circuit to a load when the stored charge is to be discharged to an external load. Although the load and an appropriate switch is not illustrated, it is not, per se, a part of the present invention but would be in the nature of a conventional selector switch well known to those skilled in the art.

In order to properly seal the cell illustrated in FIG. 2 as well as insulate the various electrodes and counterelectrode from each other, an appropriate insulating wall 44 exists which is fabricated from a suitable inert insulating material such as epoxy. In the case of both embodiments, the counterelectrode may typically be 1 mm thick while the $TiO_2$ film 34 in the embodiment of FIG. 2 is typically 2,000 Angstroms, and the tungsten oxide film 38 of FIG. 2 is typically 5,000 Angstroms thick.

It should be understood that the invention is not limited to the exact details of construction shown and described herein for obvious modifications will occur to persons skilled in the art.

We claim the following:

1. In a photogalvanic cell having an electrolyte contained between separated first electrode and counterelectrode members, the improvement comprising:
    a photoactive material contacting the first electrode to form a photoactive site;
    charge storage means located in spaced relation to the site in a manner permitting irradiating light to pass to the photoactive site without prior light filtering by the charge storage means;
    a second electrode connected to the charge storage means for conducting electrical charge therefrom; and
    means connected to the electrodes and counterelectrode for drawing converted electrical energy from the cell during irradiation by a light source and stored electrical energy after irradiation terminates.

2. The subject matter set forth in claim 1 together with a light transparent substrate located at a first end of the cell, the first electrode being deposited on the substrate, and further wherein the charge storage means is positioned in spaced relation to the first electrode, the latter two being separated by the electrolyte.

3. The subject matter set forth in claim 2 wherein the second electrode is also deposited on the light transparent substrate, the first and second electrodes being insulated from each other and separated by the electrolyte.

4. The subject matter set forth in claim 2 wherein the second electrode is deposited on a second substrate located in spaced relation to the first substrate, the electrolyte located therebetween.

5. The subject matter set forth in claim 2 wherein the electrolyte includes a material therein which sensitizes the photoactive material to visible light.

6. The subject matter set forth in claim 2 wherein the electrolyte includes a dye system which sensitizes the photoactive material to visible light.

7. The subject matter set forth in claim 2 wherein the photoactive material is $TiO_2$ powder suspended in the electrolyte.

8. The subject matter set forth in claim 7 wherein the $TiO_2$ powder is the anatase form.

9. The subject matter set forth in claim 7 wherein the $TiO_2$ powder is the rutile form.

10. The subject matter set forth in claim 2 wherein the charge storage layer comprises tungsten oxide.

11. The subject matter set forth in claim 1 wherein said photoactive material is deposited in a solid form on said first electrode.

* * * * *